Figure 1:
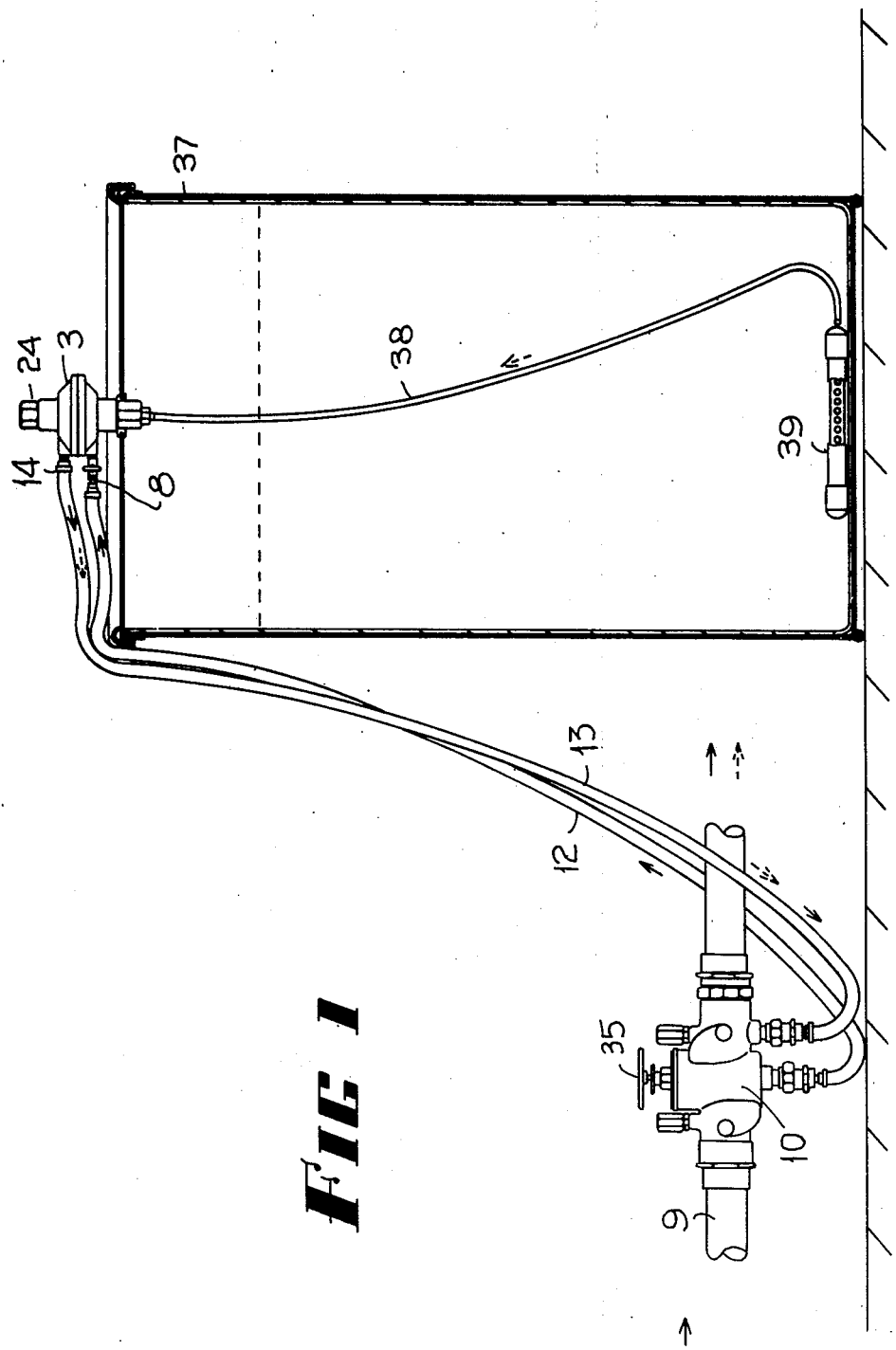

United States Patent [19]

Tucker

[11] 4,165,759
[45] Aug. 28, 1979

[54] DELIVERING MEASURED QUANTITIES OF LIQUID INTO A FLUID

[75] Inventor: Alfred D. Tucker, Kersbrook, Australia

[73] Assignee: Iplex Plastic Industries Proprietary Limited, Elizabeth, Australia

[21] Appl. No.: 731,677

[22] Filed: Oct. 12, 1976

[30] Foreign Application Priority Data

Oct. 9, 1975 [AU] Australia ............................ PC3512

[51] Int. Cl.² ........................................ G05D 11/03
[52] U.S. Cl. ..................... 137/99; 91/224; 137/564.5; 417/375; 417/377
[58] Field of Search ............... 91/224; 137/99, 101.11, 137/564.5; 417/375, 377

[56] References Cited

U.S. PATENT DOCUMENTS

| Re. 29,193 | 4/1977 | Carlyle | 137/99 |
| 2,127,730 | 8/1938 | Gunderson | 137/99 X |
| 2,240,808 | 5/1941 | Sillers | 137/99 X |
| 2,775,944 | 1/1957 | Ryder | 417/375 X |
| 3,361,036 | 1/1968 | Harvey | 91/224 |
| 3,963,038 | 6/1976 | Jensen | 137/99 |

*Primary Examiner*—Robert G. Nilson
*Attorney, Agent, or Firm*—Oldham, Oldham, Hudak & Weber Co.

[57] ABSTRACT

A method of and device for delivering measured quantities of liquid into a fluid in which a pressure differential is created in a fluid flow line and fluid is passed from the higher pressure side to a positive displacement fluid pump and returned therefrom to the lower pressure side and including a positive displacement liquid pump actuated from the fluid pump which feeds liquid to the fluid pump to mingle with the fluid passing back to the fluid flow line.

2 Claims, 2 Drawing Figures

DELIVERING MEASURED QUANTITIES OF LIQUID INTO A FLUID

This invention relates to a method of delivering measured quantities of a liquid into a fluid and in particular it is directed to the delivering of substances such as fertilizers or other additives required to be fed to water flowing to irrigation or other systems.

While the invention is not necessarily limited to this purpose, the general description herein will be made in relation to such a purpose but it is to be clear that the invention applies anywhere where it is necessary to add measured quantities of a liquid to fluids flowing through a system.

It has been proposed heretofore to use devices for introducing additives to fluid such as by utilizing a venturi or similar mechanism which creates a pressure difference which then regulates the flow of the liquid into the venturi, but such methods do not give measured doses in the sense of the present invention which supplies a measured quantity of the liquid in relation to the total flow of fluid through the system.

The objects of the invention are achieved by having in the flow line a restrictor device and taking from each side of the restrictor device, which can be in the nature of a venturi or partial obstruction, lines to an additive injecting device which has the two lines connected one on each side of a diaphragm chamber, the diaphragm having in it a valve to regulate flow from one side to the other side of the diaphragm, and one side of the diaphragm being connected to the supply of fertilizer or other liquid which it is desired to inject into the stream of fluid flowing through the injection device.

Communication of the line which leads to the additive supply is preferably through a hollow stem on the diaphragm, and this stem has in it valve means to form a pump to control the direction of flow of the fertilizer or other additive.

In operation such a device operates by pressure fluid from the higher side of the differential pressure control, flowing to one side of the diaphragm, and when the valve in the diaphragm is closed, the diaphragm is moved in its chamber to its opposite position, thus drawing a charge of the additive into the hollow of the stem, but when the diaphragm reaches the other side of its travel, the valve contacts a stop or a spring compresses sufficiently and the valve is pushed open, allowing the flow of the fluid from the now charged side of the diaphragm chamber to flow through the valve to the other side of the diaphragm and thence through the outlet back to the flow line on the lower pressure side of the restrictor device.

During this part of the cycle pressure is built up on the outlet side of the diaphragm chamber and as the valve is opened, the diaphragm has substantially uniform pressure on both sides thereof and the diaphragm is now forced back by a pressure spring preferably arranged coaxially with the stem of the diaphragm with fluid flowing through the diaphragm chamber in a relatively unrestricted manner, this continuing until the diaphragm reaches the end of this cycle whereupon the valve contacts a stop and is pushed back to its closed position.

Immediately this valve closes, water pressure holds the diaphragm valve in a closed position and the diaphragm is again moved to its opposite position by water pressure applied to it, until the valve is again opened by the valve striking a stop and the cycle thus continues so long as a fluid flow is maintained.

The action of the valve is assisted by a spring which lightly loads the valve towards its open position, but when the diaphragm approaches the end of the stroke, the valve stem compresses the spring before the diaphragm reaches the end of its stroke to cause the valve to suddenly open to the required extent, the spring ensuring that the valve remains open until it is closed by contact or spring tension at the other end of the stroke.

The additive which was trapped in the hollow of the stem between a pair of valves, one moving with the stem and the other in a fixed part of the pump chamber housing, is forced past the inner of such valves through the hollow stem into the part of the chamber where the fluid leaves the device, so that during the return movement of the diaphragm, that is under action of the spring and with the valve open, fluid is forced through the hollow stem to the outlet side of the diaphragm chamber and mingles with the fluid then flowing through this chamber.

Thus it will be realized that on one stroke of the diaphragm, the additive is drawn into the hollow stem of the diaphragm, and during the opposite movement of the diaphragm, the additive is forced out the hollow stem and mingles with the fluid flowing through the unit.

To enable the invention to be fully appreciated an embodiment will now be described with reference to the accompanying drawings but it is to be clear that the invention need not necessarily be limited to this.

Figure 2:
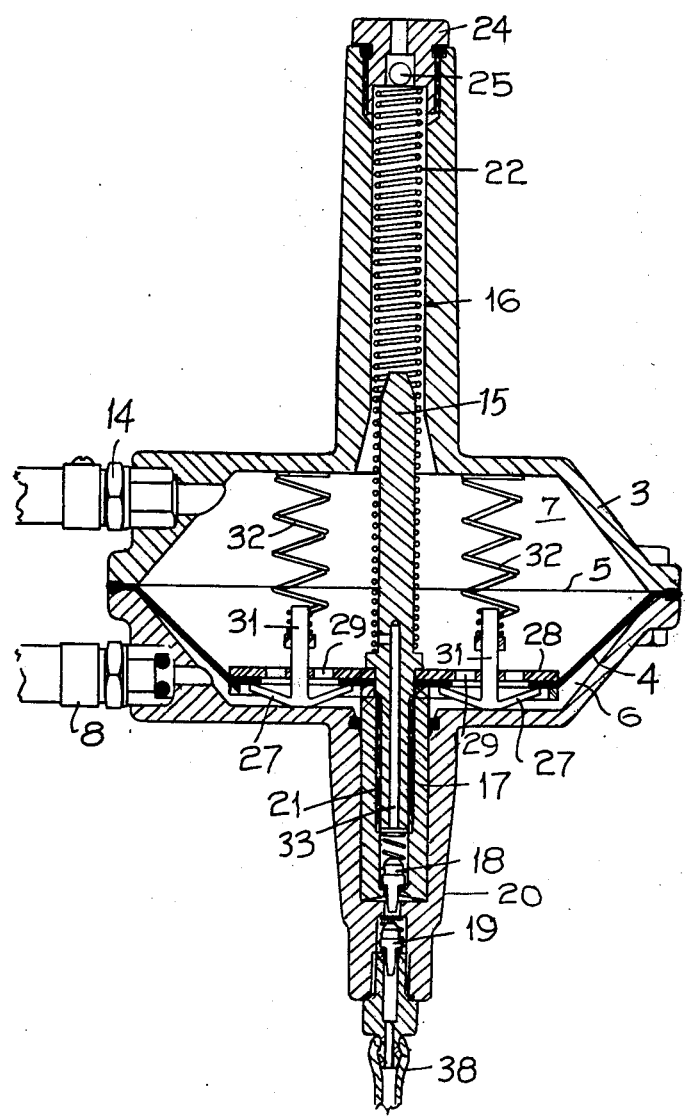

In the drawings:

FIG. 1 is a sectional side elevation of a drum showing the venturi mechanism, the feed device and the lines, and FIG. 2 is a transverse sectional view of the feed device to an enlarged scale.

The feed device comprises a two part body 3 between which is a diaphragm 4 which can be deflected into a hollow in the body in either direction in relation to is medial junction line 5.

One part of the chamber within this body will be referred to as the inlet chamber 6 and the other part as the outlet chamber 7, the chambers being defined according to which side of the diaphragm 4 they are on, but naturally both chambers vary in volume as the diaphragm moves.

The inlet 8 to the chamber 6 is taken from a higher pressure portion of the line 9 in which the basic fluid flows, the outlet chamber 7 being connected to a lower pressure portion of that line, which differential pressure can be obtained by a restrictor such as a valve or venturi 10 positioned in the line 9 or otherwise having a restriction to achieve the differential pressure in the line 9, the higher pressure side of the line 10 being connected by the line 12 to the inlet 8, while the lower pressure part of the line 9 is connected to the outlet 14 by the line 13.

The diaphragm 4 has at its centre a two part stem one end of which 15 operates in a cylinder 16 formed in the housing 3 and the lower end 17 of which is hollow has in it a one way valve 18 which is associated with a one way valve 19 in a projecting part 20 of the housing. These valves 18 and 19 allow the additive to be drawn into the pump so formed as the diaphragm 4 reciprocates the hollow stem.

The stem is formed in two parts as said and these parts 15 and 17 are screwed together at 21 to clamp the centre of the diaphragm between them. The part 17 forms a piston acting in the bore in the projecting part 20 of the housing, the bore acting as a pump chamber.

The stem 15–17 is pushed in the direction of the valve 19 in the housing by a spring 22 confined between the diaphragm stem 15 and a plug 24 on the housing and this plug has an air discharge ball valve 25 to break the suction when the pressure fluid ceases to flow, the ball 25 being normally held closed by the pressure in the chamber 7.

The valves 27 on the diaphragm 4 are carried by a valve plate 28 which has ports 29 and which is also held between the two parts of the stem 15–17 and helps to lock the centre of the diaphragm 4 to the stem. The valves are of the dome type with shafts 31 projecting through a guide in the ports 29 and are disposed to have their shafts 31 parallel with the stem 15 of the diaphragm and are proportioned such that when the diaphragm is deflected in the direction of the outlet 14, the valves are in a closed position, having been moved to this closed position when the diaphragm approaches the end of its stroke in the direction of the inlet 8 and these valves are held closed by the pressure fluid against them from the inlet 8 which pressure then forces the diaphragm 4 with the closed valves in an upward direction until the shafts 31 of these valves strike the stops formed by the top of this housing, with the diaphragm then positioned near the wall with outlet 14, but as the valves are stopped against further movement at this stage, the diaphragm moves on due to pressure from the inlet chamber 6 until the valves are forced open, whereupon fluid flow through the valve ports 29 occurs and as the pressure on the two sides of the diaphragm 4 equalises the valves are held in an open position by the springs 32 and fluid continues to flow from the inlet 8 through the outlet chamber 7 to the outlet 14 but the spring 22 returns the diaphragm in the direction of the inlet chamber until such time as the valves contact the wall at the lower end of the housing, and the cycle again commences.

Obviously as the diaphragm moves the stem 15–17 up and down, the pump which is formed by the part 17 of the stem operating in the bore of the part 20 of the housing causes liquid to be drawn through the valve 19 as the stem 17 moves up in the bore as the diaphragm is upwardly displaced and this liquid is then forced through the hollow 33 of the part 15 of the stem as the diaphragm moves back. This liquid is first drawn into the bore of the part 20 of the housing and is then discharged from this through the hollow 33 to mingle with the fluid above the diaphragm 4. A division other than a diaphragm can of course be used, such as a piston.

From the foregoing it will be realized that a device is provided which forms a reciprocating pump which serves to inject measured quantities of liquid into the fluid flowing through the device, and as it is a positive displacement pump, rather than a venturi type of mechanism previously used, this pump, because it is driven by the fluid itself, will discharge in proportion to the amount of fluid flowing through the system.

Thus for a given volume of fluid flowing through the system, the pump will inject a measured amount of liquid into such fluid.

A further advantage of this system is that the pump requires no driving means as it is simply driven by differential pressure in the line through which the fluid, which is to have the additive supplied to it, flows. A self contained unit thus results which is highly effective in supplying regulated quantities of an additive to a fluid.

To change the proportions of additives supplied for a given volume of fluid, it is only necessary to vary the differential pressure to the unit, and this can conveniently be achieved by for instance having a valve control 35 associated with the port 10 of the fluid line which causes a decrease in pressure on the outlet side of the lines below the valve.

The measuring unit is fitted to a container 37 in which the additive is held and which may be a removable attachment so it can be applied to drums or the like containing the additive, and the suction side of the unit, that is the valve 19, has on it a tube 38 which communicates with a filter 39 which is lowered into the supply of the additive, thus achieving a simple unit which is connected to the flow line 9 by a pair of flexible hoses 12 and 13.

In this specification the expressions "liquid" and "fluid" have been used for clarity of description but it should be understood that the word "liquid" includes also a "fluid".

I claim:

1. A device for delivering measured quantities of liquid into a fluid comprising a housing having a chamber therein, a movable diaphragm across said chamber to divide said chamber into a fluid inlet space and a fluid outlet space, a diaphragm spring between the housing and the diaphragm to urge the diaphragm into the fluid inlet space, inlet means on said housing communicating with said fluid inlet space, outlet means on the said housing communicating with the fluid outlet space, ports in the said diaphragm to allow fluid flow therethrough, valves on the said diaphragm positioned to open said ports when the diaphragm is deflected into the fluid inlet space by the said spring, said valves contacting said housing to effect closure, shafts on said valves to move the said valves to open the said ports when the said diaphragm is urged into said fluid outlet space whereby to substantially equalize pressure on both sides of the said diaphragm, springs between said shafts and the said housing to urge the valves to the open position whereby to hold said valves open during return of the diaphragm by the said diaphragm spring until closed by said valves contacting said housing, a hollow stem secured to the said diaphragm to move axially with the said diaphragm, a pump chamber forming part of said housing coaxial with said stem, a hollow piston in said pump chamber secured to said stem, an inlet to the said pump chamber including a non-return valve, an outlet from the said pump chamber through a non-return valve and through the hollow in the said stem to the fluid outlet space of said chamber, whereby the said piston in said pump chamber delivers a measured quantity of liquid into said fluid outlet space to mingle with the fluid flowing through the said fluid outlet space further characterized by said inlet and said outlet to the main chamber being connected to a fluid line with said inlet connected to said fluid line before a restrictor in said fluid line and said outlet connected after said restrictor in the direction of fluid flow.

2. A device according to claim 1 characterised by said device being attached to a container with a line from the inlet valve of the pump chamber connecting to a filter in the bottom of said container.

* * * * *